Nov. 7, 1967 R. A. STEPHENS 3,351,702

INTERCONNECTION MEANS AND METHOD OF FABRICATION THEREOF

Filed Feb. 24, 1966 2 Sheets-Sheet 1

INVENTOR
RAYMOND A. STEPHENS
BY Arthur Frederick
ATTORNEY

INTERCONNECTION MEANS AND METHOD OF FABRICATION THEREOF

Filed Feb. 24, 1966 2 Sheets-Sheet 2

INVENTOR
RAYMOND A. STEPHENS
BY Arthur Freilich
ATTORNEY

United States Patent Office 3,351,702
Patented Nov. 7, 1967

3,351,702
INTERCONNECTION MEANS AND METHOD OF FABRICATION THEREOF

Raymond A. Stephens, Springfield, Mo., assignor to The Bunker-Ramo Corporation, Stamford, Conn., a corporation of Delaware Filed Feb. 24, 1966, Ser. No. 529,876
6 Claims. (Cl. 174—68.5)

ABSTRACT OF THE DISCLOSURE

A structure for supporting and interconnecting electrical circuit components. The structure is comprised of a stack of electrically conductive plates. Interconnections, effectively constituting coaxial transmission lines, are formed using the conductive plates as ground planes. Aligned troughs are formed in opposed surfaces of the plates. A dielectric adhesive sheet is disposed between adjacent plates. The sheet supports an electrically conductive path in alignment with a pair of opposed troughs.

This invention relates generally to electrical interconnection means and a method of fabrication thereof which are particularly useful for interconnecting microminiaturized high speed circuits.

As the switching and clock rates of various systems, such as digital data processing systems, are increased, the characteristics of the circuit interconnection means employed in such systems become significant. That is, whereas the characteristics of the interconnection means are of little importance when used with relatively low frequency signals, they can have a pronounced effect on system performance when the transient durations (rise and fall times) of the signals become a significant fraction of the time required to propagate the signals between circuits or components thereof. Additionally, system performance is greatly affected when signal propagation time between circuits is not negligible in comparison with the system clock period. Where the transient or clock durations become greater than five to ten percent of the signal propagation time between circuits via the interconnecting means, the interconnecting means must be regarded as a distributed circuit element and therefore must be considered as an integral part of the circuitry itself if accurate and predictable results are to be achieved. Concisely stated, where the signal propagation time is significant, the interconnection means must be viewed as a transmission line and transmission line theory must be applied to achieve proper circuit and system designs.

Recognizing that the interconnection means must be considered as a transmission line, it follows that the line must be uniform and properly terminated with respect to impedance if signal reflections and resulting distortions are to be prevented. That is, if the interconnection means is not uniform in the sense of the physical and electric properties, then the non-uniformities (gradual or abrupt) appear as changes in the characteristic impedance resulting in signal reflections. Such reflections can have a detrimental effect on circuit performance by, for example, resulting in triggering delays. When interconnection propagation time becomes comparable to the clock period, reflections become especially troublesome because the reflected signal, if not sufficiently attenuated, can spill over into the logic allocation for the next clock period, thus causing circuit malfunctions.

In addition to signal distortion problems resulting from signal reflections, crosstalk problems resulting from coupling between adjacent circuits become significant in high speed circuitry because of the rates of change in the electric and magnetic fields during transients. These problems, of course, can become of special importance when high interconnection densities are involved for compatibility with microminiaturization afforded by integrated circuits.

In view of the foregoing considerations, various attempts have been made in the prior art to develop techniques for interconnecting high speed circuits and more particularly high speed microminaturized circuits. Some of these techniques are discussed in U.S. patent application Ser. No. 430,321, filed on Feb. 4, 1965, and assigned to the same assignee as the present application. The cited patent application discloses an improved means suitable for interconnecting high speed circuits together with a period of fabricating such an interconnection means.

More particularly, the cited patent application discloses an interconnection technique which involves providing planar coaxial interconnection between components and circuits. The interconnection means are formed, according to a preferred embodiment of the disclosed invention, by etching troughs in opposed faces of conductive ground plates, formed of aluminum for example. Epoxy is deposited in each of the troughs and a conductor is then formed on the surface of the epoxy in one of the troughs. A conductive bonding material, such as a metal loaded epoxy, is then deposited on the opposed surface of the aluminum plates. A non-conductive epoxy is deposited opposite to the conductor on the epoxy in the trough. The two plates are then laminated together by the application of heat and pressure.

An interconnection structure constructed in accordance with the teachings of the cited patent application possesses characteristics which make it extremely attractive for the contemplated applications. The structure provides uniform self-shielded transmission lines which can easily be employed to connect logic circuits. In addition, a continuous range of characteristic impedances can be obtained as a function of the geometry of the troughs and the width of the conductors. This provides a great advantage over an interconnection approach using miniature coaxial cable where only a few discrete values of impedance are available. High interconnection densities with negligible crosstalk can be achieved making this approach compatible with packaging densities afforded by integrated circuits. The high packaging densities, in turn, will enable miniaturization of propagation time within the system. The aluminum plates also assure that the interconnection structure has excellent heat dissipation characteristics.

The present invention is based upon the recognition that by modifying the method and apparatus of the cited patent application in certain respects, fabrication costs can be considerably reduced without significantly degrading its characteristics. More particularly, in accordance with the present invention, in lieu of filling the troughs with epoxy and depositing conductors on the surface thereof, a conductor clad sheet of material is employed in conjunction with the opposed conductive plates. The sheet material can, for example, comprise a copper clad epoxy sheet XM6500 manufactured by Minnesota Mining and Manufacturing Co. The copper can be etched from the sheet to form a desired conductor pattern thereon. The sheet is then placed between the plates with the conductors being aligned with the troughs. The stack is then heated under pressure to bond the plates together and thus effectively support the conductors in an air gap between the plates.

It has been found that planar coaxial circuitry can be provided in accordance with the present invention at a significantly lower cost than in accordance with the teachings of the cited patent application with only a slight degradation of qualities.

The novel features that are considered characteristic of this invention are set forth with particularity in the appended claims. The invention itself will best be understood from the following description when read in connection with the accompanying drawings, in which:

Figure 1:
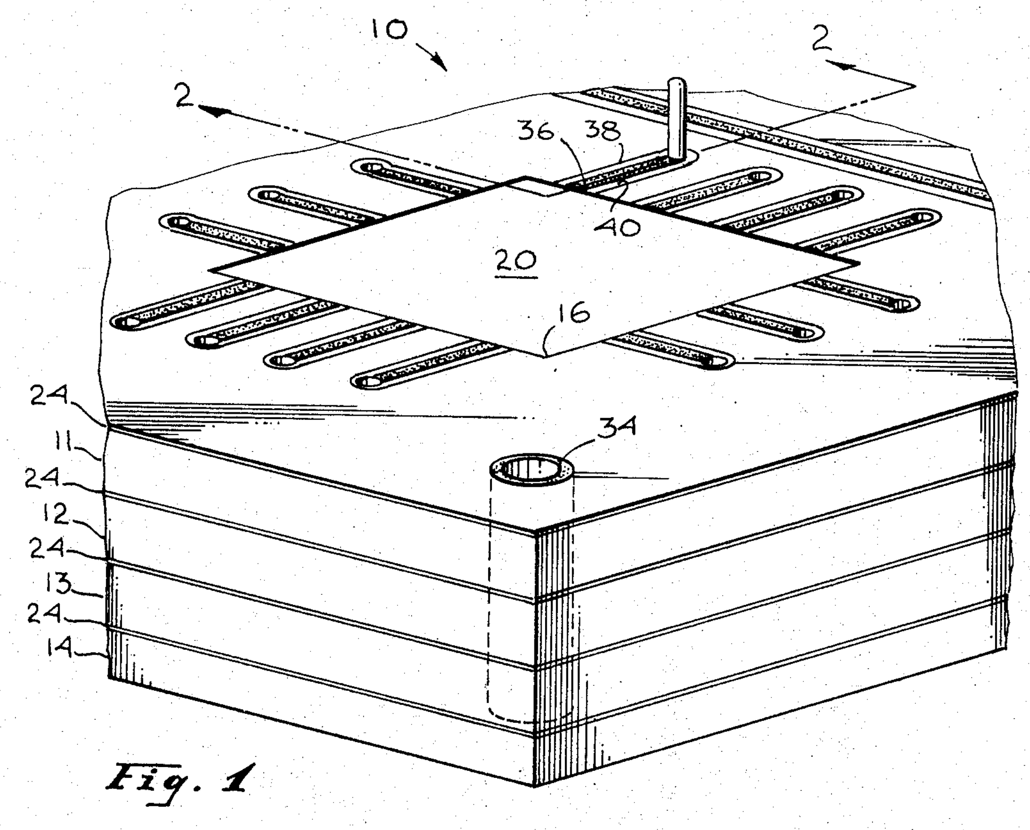
FIGURE 1 is a perspective view illustrating a multilayered coaxial circuit assembly constructed in accordance with the present invention.
Figure 2:
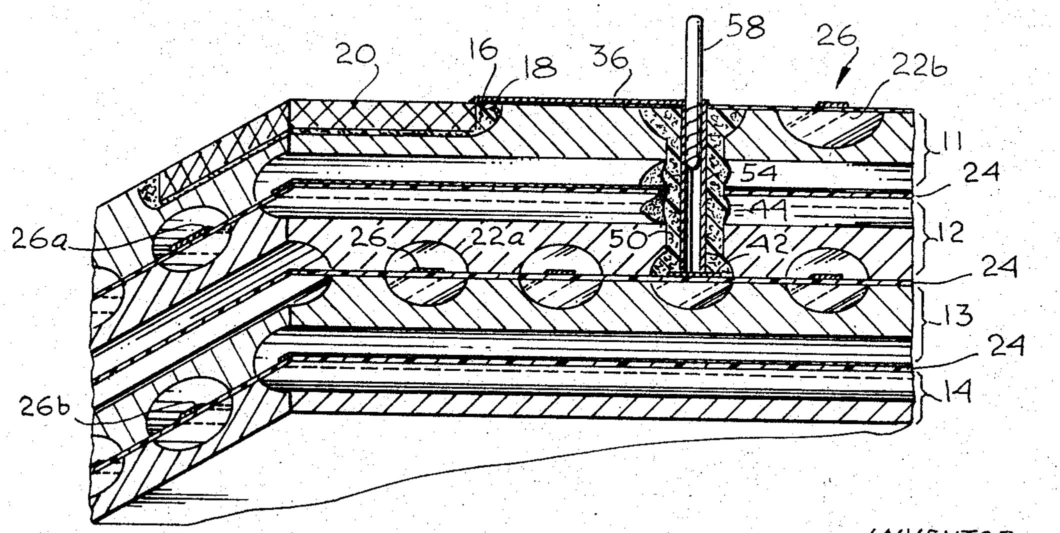
FIG. 2 is a sectional view taken substantially along the plane 2—2 of FIG. 1.

Attention is now called to FIGS. 1 and 2 of the drawings which illustrate a portion of a completed electronic assembly 10 constructed in accordance with the present invention. The assembly is comprised of a plurality of stacked boards or plates 11, 12, 13, 14, which are formed of a conductive material such as aluminum, copper, magnesium, low alloy steel, or other metal. The plates 11, 12, 13, both of whose surfaces are to be used to carry circuitry, nominally have a thickness between 0.015 inch and 0.10 inch. Their thickness can, however, be suitably larger if necessary to carry components or circuits mounted therein. On the other hand, the thickness of plate 14 which is used as a cover plate and thus only has circuitry on one side thereof need not be so large.

As an example, the upper plate 11 in the assembly 10 is provided with a recess 16 therein. The recess is partially filled with a dielectric material such as epoxy 18, and supported on the epoxy is, for example, a discrete monolithic or other microelectronic function block 20. A plurality of such function blocks 20 can be distributed throughout the assembly 10. In accordance with the present invention, inexpensive means are provided for interconnecting such function blocks 20 to each other and to components external to the assembly 10. As noted in the introduction to the present specification, such interconnecting means must be treated as transmission lines if the function blocks 20 are to be operated at extremely high speeds.

In accordance with the present invention troughs 22 are defined in the top and bottom surfaces of each of the plates. The troughs in each surface preferably extend parallel to one another to avoid interference. Troughs on opposite plate surfaces, however, preferably extend perpendicular to one another so as to form a matrix. It should be understood, however, that the invention is not restricted to any particular pattern of troughs and indeed any arbitrary pattern can be employed. The plates are oriented so that each trough thereof is mated with a similar trough in the adjacent surface of an adjacent plate. Thus the troughs in the bottom surface of plate 12 are aligned with and opposed by the troughs in the top surface of plate 13.

Sheets of dielectric adhesive material 24 are disposed between adjacent surfaces of adjacent plates. The dielectric sheets carry conductors 26 thereon which are oriented so as to be aligned with the center of the troughs. Each conductor 26 is thus disposed substantially in an air gap between opposed troughs supported on the sheet of dielectric material 24.

Adjacent surfaces on adjacent plates are bonded together by setting the dielectric adhesive 24. For example, the dielectric material sheet 24 disposed between the bottom surfaces of plate 11 and the top surface of plate 12 can comprise a partially cured (B stage) epoxy. In order to set the epoxy to thus bond the plates together, appropriate heat and pressure can be applied.

It should be apparent from what has been said thus far that the conductors 26 will be almost completely surrounded and shielded by the conductive material of the plates separated therefrom by an air gap. The sheet of dielectric adhesive 24 will slightly space adjacent plate surfaces from one another, but it has been found that this spacing does not substantially degrade the shielding around the conductor 26. In order to assure electrical interconnection between all of the plates to permit them to function as a common ground plane, a hole 34 is provided extending through all of the plates and through the adhesive therebetween. The inner wall of the hole 34 is plated with a conductive material to thus electrically interconnect the plates.

From what has been said thus far, it should be appreciated that each conductor 26 together with the surrounding ground plane is directly electrically equivalent to a conventional coaxial line susceptible to analysis by conventional transmission line theory. It should thus be recognized that the electrical characteristics of the interconnections in the assembly 10 are in part determined by the dimensions and geometry of the central conductor 26 and the troughs 22. In accordance with the present invention, these parameters can be accurately controlled. That is, since the conductor 26, as will be described in greater detail hereinafter, is preferably formed by selectively etching a conductor clad sheet of dielectric material, its dimensions can be very accurately controlled. Likewise, the geometry of the troughs 22 can be accurately controlled inasmuch as these can also be formed by etching. In order to demonstrate that the dimensions of the conductors 26 and geometry of the troughs 22 can be formed to selected dimensions and geometry, conductor **26*a* is illustrated as having a greater width than conductor 26*b*. Similarly, the trough 22*b* is illustrated as having a different geometry than the trough 22*a***.

As noted, the conductors 26 interconnect the function block 20 to either other function blocks in the assembly 10 or to external circuits and components. For example, conductors 36 on dielectric sheet 38 aligned with troughs 40 are connected to the function block 20. In order to provide circuit connections between plates, as for example, from the conductor 36 adjacent the top surface of plate 11 to the conductor 42 between plates 12 and 13, aligned holes 44 are provided in both plates 11 and 12. The aligned holes 44 and the portions of the troughs aligned therewith in the top surface of plate 11 and the bottom surface of plate 12 are filled with a dielectric material 50 such as epoxy. A second coaxial hole 54 is formed through the dielectric material 50 extending completely through the plates 11 and 12. The wall of the hole 54 is plated with a conductive material 56 to thus interconnect the conductors 36 and 42. A conductive rod 58 can be fitted in the hole 54 in contact with the conductive material 56 for interconnection with external devices.

Figure 3:
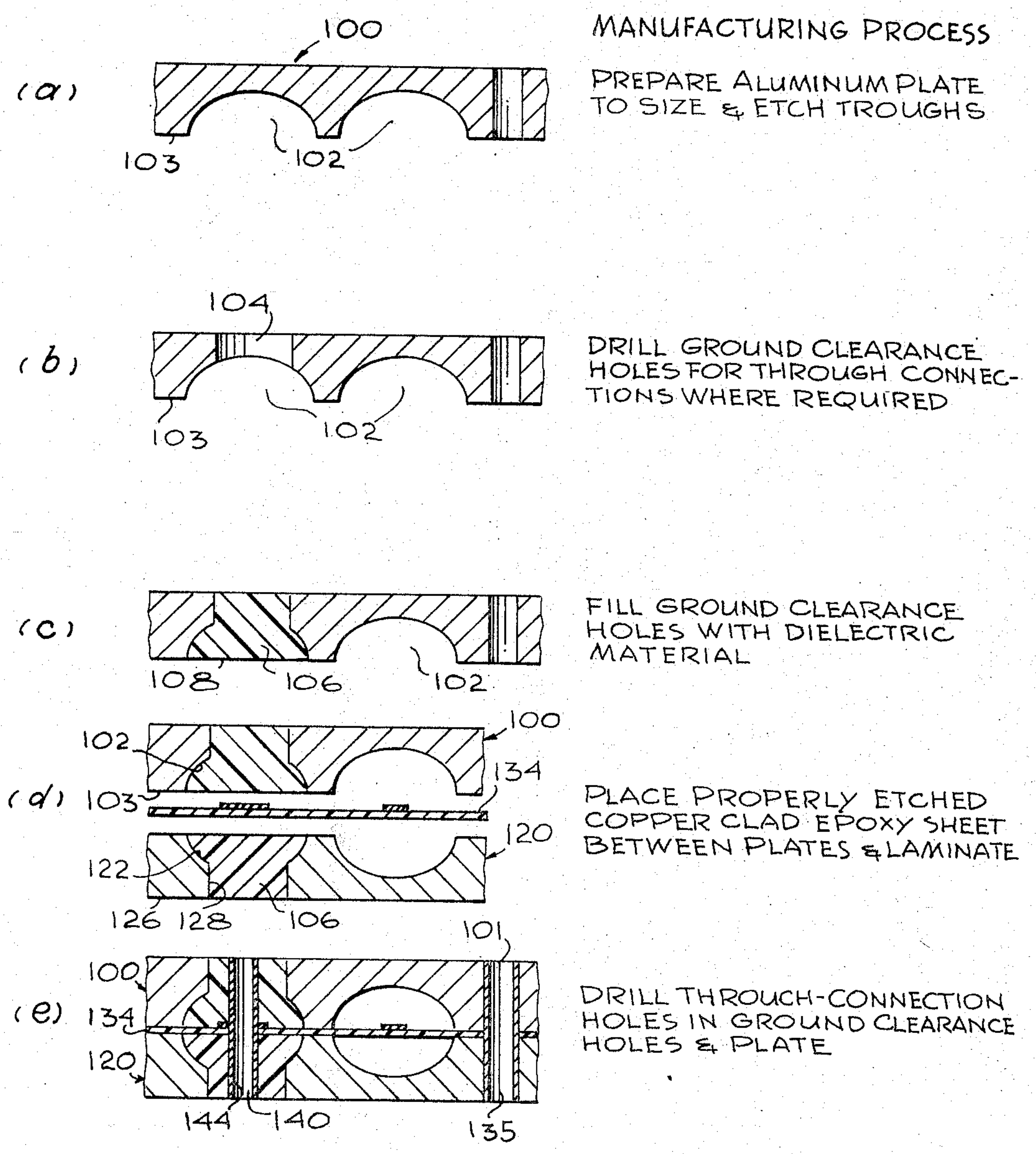
FIG. 3 is comprised of diagrammatic illustrations depicting the steps involved in manufacturing coaxial circuit structures in accordance with the present invention.

Thus far, only the construction of the assembly 10 of FIGS. 1 and 2 has been considered and the steps involved in a method of fabricating such an assembly have not been mentioned. In order to describe an optimum method of fabrication, attention is now called to FIG. 3 which illustrates in views (*a*)–(*e*) a sequence of steps employed to fabricate the assembly 10 of FIGS. 1 and 2.

Typically, an aluminum plate 100 (FIG. (3*a*)) is employed having a thickness on the order of .015–.10 inch or more depending upon whether it is to be provided with cavities for receiving function blocks as aforedescribed. The plate 100 is initially prepared by shearing it to the desired size from aluminum sheet material. Registration holes 101 are then drilled in the plate. An additional plate of the same dimensions as plate 100 to be used for covering the circuitry on the plate 100 is also prepared from the aluminum sheet material and has registration holes drilled therein.

The surfaces of the plate 100 are then prepared for the application of a photoresist mask by conventional techniques which may consist of dry sanding, and the application of cold solvent degreasing material and other surface treating solutions.

A metal etch photoresist is then applied to the bottom surface 103 of the plate 100. The resist is then exposed and developed in all areas except where the troughs 102 are to be formed. The plate 100 is then chemically etched to form the troughs 102. The metal etch resist is then removed.

Holes 104 are then drilled through the plate 100 into the troughs 102 where electrical through connections are desired. The holes 104 and the portions of troughs 102 aligned therewith are then filled with a dielectric material 106 which is bonded to the plate 100. The dielectric material 106 is then lightly sanded to remove any excess material and make its surface 108 substantially coplanar with the bottom surface of the plate 100.

A second plate 120 (FIG. (*3d*)) is also subjected to the fabrication steps illustrated in FIGS. (*3a*)–(*3c*) to thus form troughs 122 constituting mirror images of the troughs 102. Where through holes are desired, the troughs 122 communicate with a bottom surface 126 through ground clearance holes 128. The troughs 122 and ground clearance holes 128 in plate 120 are filled with the dielectric material 106 which is also sanded so as to be essentially coplanar with the top surface 130 of plate 120.

Subsequently, a conductor clad sheet of dielectric adhesive material 134, e.g. a sheet of copper clad epoxy manufactured by Minnesota Mining and Manufacturing Co. (XM6500), is coated with a conventional photoresist. This resist is then developed through a mask which covers all portions of the copper except those which are to form the conductors. The unprotected copper is then etched from the epoxy sheet leaving the desired conductor pattern thereon. The resist is then removed. As should be appreciated, if desired, conductor patterns can be simultaneously formed on both sides of the epoxy sheet. The epoxy sheet is then registered to the plates 100 and 120 with the conductors aligned with the appropriate troughs. Suitable heat is then applied to the adhesive 134 while pressure is applied to the plates 100 and 120 to thus laminate them together.

Subsequently, a hole 140 is drilled through the plates 100 and 120 in alignment with the centers of the ground clearance holes 104 and 128. The wall of the hole 140 is then plated with copper 144.

An additional hole (not shown) can be drilled through the plates 100 and 120 and the adhesive 134 therebetween. The wall of this hole could then be plated to thus electrically interconnect the plates and enable them to function as a common ground plate. Alternatively, the walls of the registration holes 101 and 135 can be plated through to interconnect the plates 100 and 120.

From the foregoing it should be appreciated that a means together with a method of fabrication thereof has been provided herein for interconnecting high speed microminiaturized circuits. The interconnection means possesses the essential characteristics of and can be treated as a transmission line. In summary, the concept is, of course, to sandwich a sheet of dielectric adhesive between a pair of conductive plates so that the conductors carried by the sheet are disposed within an air gap formed between opposed troughs in the plates. Means fabricated in accordance with the present invention are less expensive than means provided by previous fabrication techniques, as for example, disclosed in the aforecited patent application. However, it is pointed out that the present invention can be compatibly employed with other techniques, e.g. that disclosed in the cited patent application, where desired, to achieve particular structural configurations.

What is claimed is:

1. An electrical circuit structure including:

first and second electrically conductive nonmagnetic plates supported in superposed relationship with first surfaces of said plates adjacent one another;

a sheet of dielectric material disposed between and in contact with each of said plates;

aligned troughs formed in said first surfaces of said first and second plates; and a single electrically conductive path supported on said dielectric sheet in alignment with opposed troughs, said sheet constituting the sole support for said conductive path.

2. The circuit structure of claim 1 wherein said sheet of dielectric material comprises an adhesive bonding said first and second plates together.

3. The circuit structure of claim 1 including means electrically interconnecting said first and second plates.

4. The circuit structure of claim 1 including a hole extending through said first and second plates and said sheet of dielectric material; and a conductive lining in said hole electrically connecting said first and second plates.

5. The circuit structure of claim 1 wherein a plurality of parallel troughs are defined in said first surfaces of said first and second plates;

a plurality of parallel troughs defined in a second surface of said first plate extending perpendicular to the troughs defined in the first surface thereof;

a third electrically conductive nonmagnetic plate supported with a first surface thereof adjacent said second surface of said first plate;

a plurality of parallel troughs defined in said third plate first surface aligned with and opposed to said troughs defined in said first plate second surface; and a single electrically conductive path supported between opposed troughs defined in said third plate first surface and said first plate second surface.

6. The circuit structure of claim 1 wherein said first and second plates are each rigid and said sheet of dielectric material is flexible.

References Cited

UNITED STATES PATENTS 3,025,480 3/1962 Guanella ---------- 333—84 X
3,258,724 6/1966 Walsh et al. --------- 333—84

DARRELL L. CLAY, *Primary Examiner.*